US009382747B1

(12) United States Patent
Anderson et al.

(10) Patent No.: US 9,382,747 B1
(45) Date of Patent: Jul. 5, 2016

(54) PRO-ACTIVE BUILDING PROTECTION SYSTEM

(71) Applicant: International Business Machines Corporation, Armonk, NY (US)

(72) Inventors: Evelyn R. Anderson, Houston, TX (US); Michael Bender, Rye Brook, NY (US); Rhonda L. Childress, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/985,068

(22) Filed: Dec. 30, 2015

(51) Int. Cl.
*G01W 1/00* (2006.01)
*E05F 15/71* (2015.01)
*G08B 25/00* (2006.01)
*H04L 12/28* (2006.01)

(52) U.S. Cl.
CPC .............. *E05F 15/71* (2015.01); *G08B 25/008* (2013.01); *H04L 12/2803* (2013.01); *G05B 2219/2642* (2013.01)

(58) Field of Classification Search
CPC ................. E05F 15/71; G08B 25/008; G05B 2219/2642; Y02P 90/02; H04L 12/2803
USPC ............... 340/601, 501, 540; 160/5; 367/197; 49/31
See application file for complete search history.

(56) References Cited

U.S. PATENT DOCUMENTS

| 8,091,604 | B2* | 1/2012 | Kluck ..................... E05F 15/71 160/5 |
| 2012/0144743 | A1* | 6/2012 | Piney ..................... E05F 15/71 49/31 |
| 2014/0306833 | A1* | 10/2014 | Ricci .................... G08B 25/016 340/901 |
| 2015/0243163 | A1* | 8/2015 | Shoemake ............... H04L 1/16 367/197 |

FOREIGN PATENT DOCUMENTS

| CN | 2809155 Y | 8/2006 |
| CN | 203441254 U | 2/2014 |
| CN | 204511147 U | 7/2015 |

* cited by examiner

*Primary Examiner* — John A Tweel, Jr.
(74) *Attorney, Agent, or Firm* — Weitzman Law Offices, LLC

(57) ABSTRACT

An automated system for pro-active protection of a building from damage due to weather conditions includes multiple sensors establishing a perimeter about the building, a weather alert receiver, a master controller, storage including multiple automated protocols, and multiple actuators. The master controller will, when a weather alert is received indicating a particular weather condition will be occurring within an area encompassing the perimeter, without any human intervention: automatically execute a specific protocol to thereby cause at least some of the multiple actuators to change at least one protective device from a non-protective to a protective position until a signal is received that the weather alert is no longer in effect, or that the particular weather condition is no longer a potential danger to the building, at which time the master controller will automatically signal the actuators to return to the non-protective position.

1 Claim, 3 Drawing Sheets

PRO-ACTIVE BUILDING PROTECTION SYSTEM

FIELD OF THE INVENTION

This disclosure relates generally to computing technology and, more particularly, to computer-based security systems.

BACKGROUND

Inclement weather is a potential danger to buildings, particularly residential houses. That danger can be magnified for residential houses that are rental properties, second homes, etc. which may be remote from the owner/caretaker and go unoccupied for periods of time.

While some inclement events, for example hurricanes, provide sufficient warning for an owner or caretaker (or someone designated by them) to go to the building and make sure that all windows and doors are closed and secured and, if necessary, additional protections such as storm shutters and storm doors are secured, many weather events are more localized, for example, hail storms, unusual sleet/snow/freeze events in warmer areas, sudden dust/wind/rain storms, and tornadoes, and may occur without much warning. Moreover, it is common for weather paths to change such that a property may initially appear to be clearly outside the path of a weather event, only to have conditions suddenly change placing the property squarely within the path of the weather event. For those situations, it is often difficult or impossible for the owner or caretaker (or their designee) to take action to secure the building in time.

Damage caused by such "short-warning" weather events, if they break windows or breach the exterior envelope of the building can be costly to the property owner and, where insurance coverage is involved, to insurance companies.

Recently, smart phones have given people the ability to remotely control aspects of the home like window blinds/shades, lights, and windows using their phone. In addition, some window technology has taken automation a step further and include rain sensors that, when they detect rain will automatically cause an open window to close.

However, the remote control technologies require that a person be aware of the localized danger, despite being removed from the area. In the case of the self-closing windows, they purely react to the sensing of rain that is already occurring and cannot take into account other types of weather events.

SUMMARY

We have devised a system that, without any human intervention, can pro-actively protect a building against a potential weather event threat before an event occurs and, should the event pass or when it does, undo the protective measures it has put into place.

One aspect of this disclosure involves an automated, computerized system for pro-active protection of a building and/or associated property from damage due to localized weather conditions. The system includes multiple sensors establishing a perimeter about the building, a weather alert message receiver, a master controller, including at least one processor, communicatively connected to the multiple sensors and the weather alert message receiver. The system further includes storage, accessible by the master controller, having stored therein multiple automated protocols. The multiple automated protocols are executable by the processor of the master controller in response to a received weather alert message. In addition, the system includes multiple actuators connected to protective devices of the building, the multiple actuators being communicatively connected to, and under the control of, the master controller. The master controller will, when a weather alert is received via the weather alert message receiver indicating a particular weather condition will be occurring within an area encompassing the perimeter, without any human intervention: i) automatically execute a specific protocol from among the multiple automated protocols to thereby cause at least some of the multiple actuators to change at least one protective device from a non-protective position to a protective position until, as specified by the specific protocol, a signal is received by the master controller a) via the weather alert message receiver, that the weather alert is no longer in effect, or b) from at least some of the multiple sensors, indicating that the particular weather condition is no longer a potential danger to the building, at which time the master controller will automatically signal the at least some actuators to return the at least one protective device to the non-protective position.

Advantageously, the system will pro-actively protect the building and/or associated property to help avoid damage as opposed to reacting to the weather as it is occurring or requiring a person to become aware of a potentially local situation from a remote location and take action in response.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems that improves upon current computerized home automation technology.

In overview, we have devised a system that proactively, and automatically, responds to weather alerts for an area encompassing a building and, based upon the alert alone, or in conjunction with sensors in the area of the building, will select and execute an appropriate protocol to protect the building and/or associated property in advance of a weather condition actually occurring and, once the weather condition is no longer a threat, will remove the protections.

Figure 1:
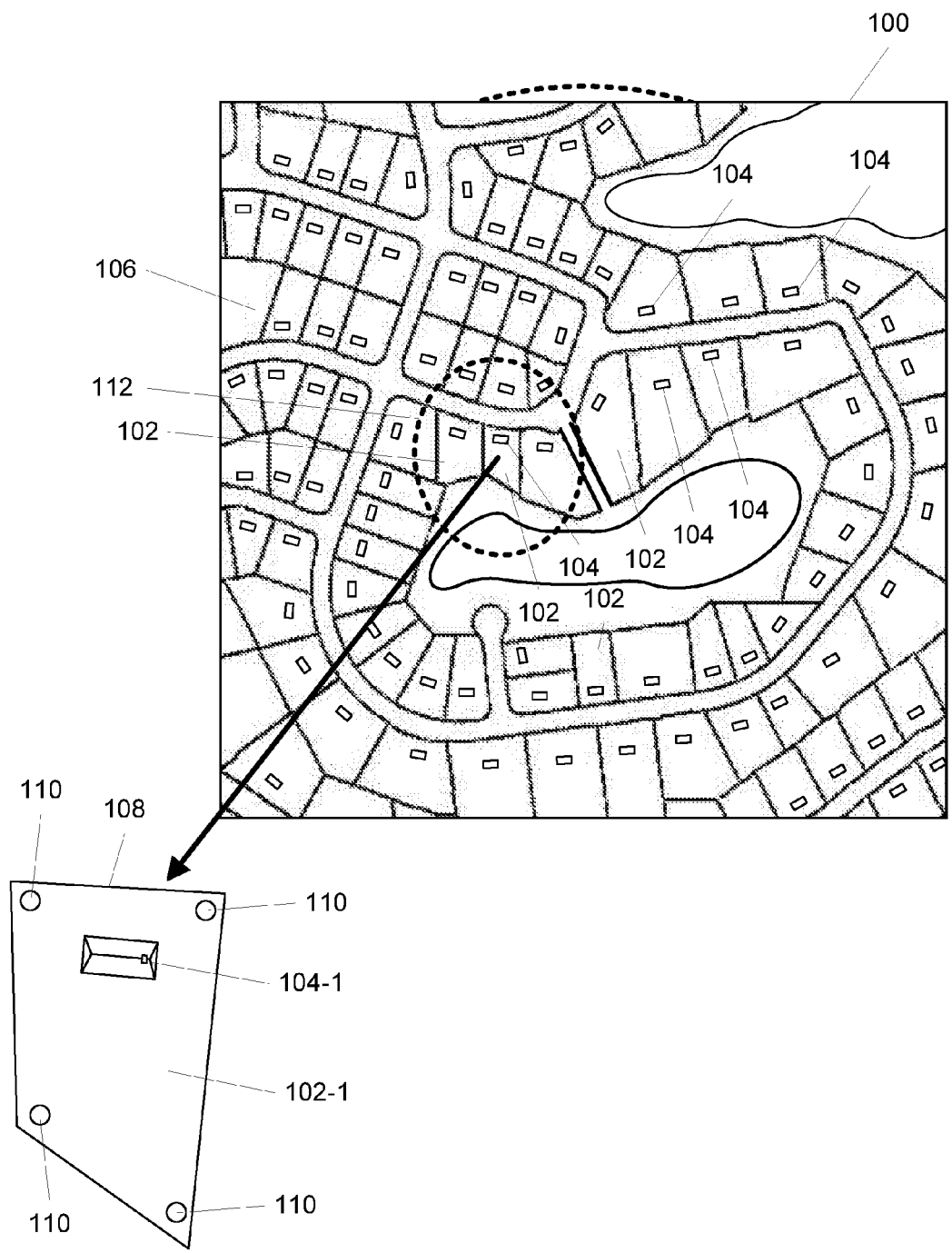
FIG. 1 illustrates, in simplified form, an aerial overview of part of a map showing residential plots of land containing buildings within a local geographic area.

FIG. 1 illustrates, in simplified form, an aerial overview of part of a map 100 showing residential plots of land 102 containing buildings 104 within a local geographic area 106, with one of the plots 102-1 shown exploded out and enlarged.

As will be described in greater detail below, within a perimeter 108 defining the plot of land 102-1 are multiple sensors 110 that collectively establish a geographic perimeter 112 about the building 104-1 for weather-related detection purposes as described herein. The sensors 110 are constructed using conventional commercially available sensors that can be used to detect and issue signals relating to various weather-related circumstances, for example, barometric pressure, temperature change(s), rain, wind speed and/or direction, vibrations, amount of, and change in, impinging light, etc. as appropriate for the location and local weather alerts to be dealt with. The sensors 110 may be "dumb" in that they simply convey data reflecting the condition(s) they sense or they may include some level of "intelligence" (e.g., Internet of Things (IoT) sensors) that can allow them to, for example, turn on in response to a weather alert signal, or to poll or communicate with each other to ascertain if a condition actually exists before signaling the master controller 204. For example, if a rain sensor is getting wet, it may communicate with the other rain sensors to ascertain whether it is truly raining or, for example, a sprinkler is wetting it. Similarly, the sensors might communicate to differentiate a weather condition from, for example, nearby use of a lawn mower or leaf blower.

Figure 2:
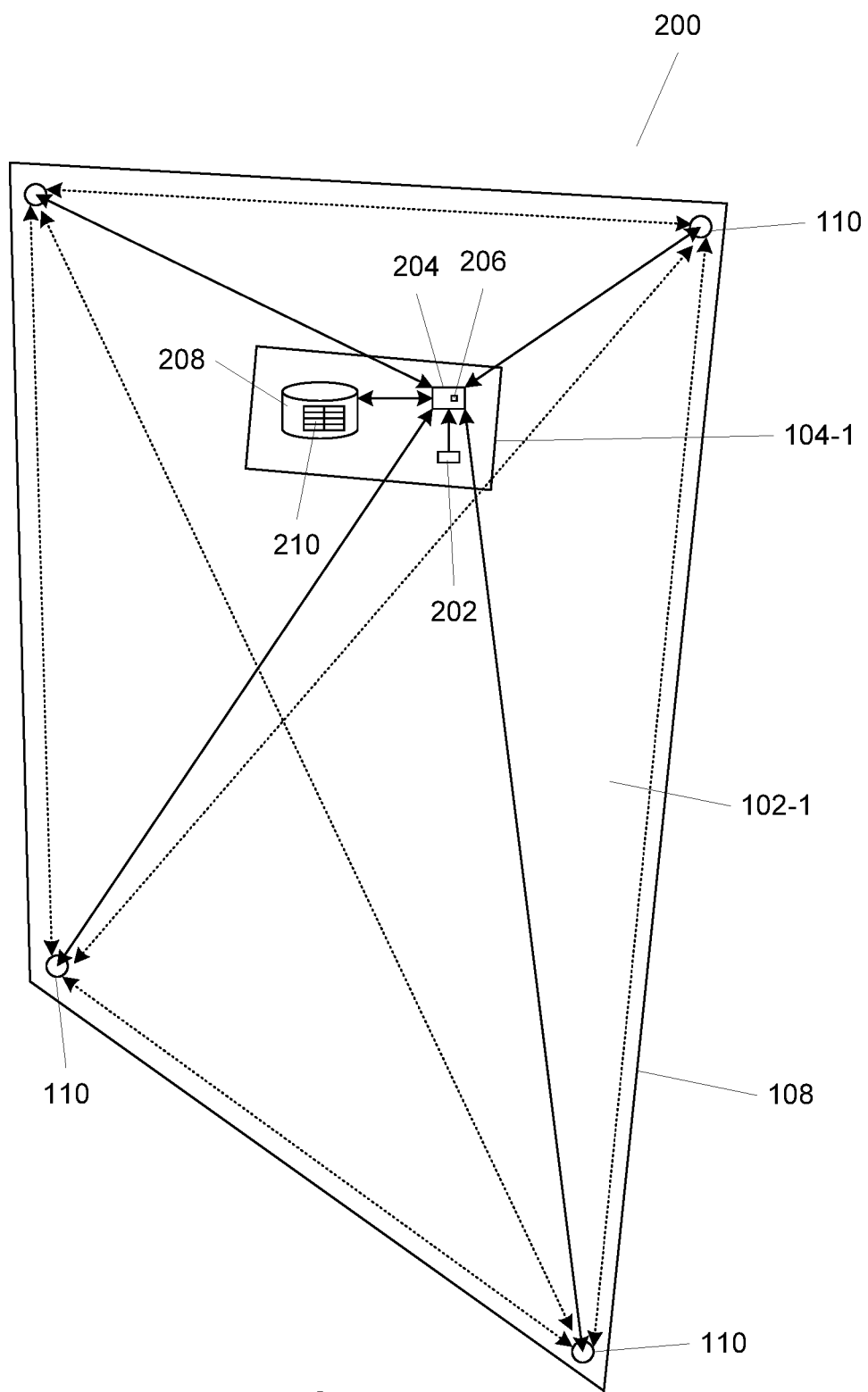
FIG. 2 illustrates, in simplified form, a larger representation of the aerial view of the plot shown in enlarged view in FIG. 1.

FIG. 2 illustrates, in simplified form, a larger representation of the aerial view of the plot 102-1 shown in enlarged view in FIG. 1, and illustrating the components of our automated computerized system 200 for pro-actively protecting a building and/or associated property from damage due to weather conditions as described herein. Although not at all to scale, as represented in FIG. 2, outside the building are the sensors 110 of the system 200, and inside the building 104-1 are other parts of the system including, a weather alert message receiver 202 that is specifically attuned to receive broadcast weather alert signals (wirelessly, over a wired connection, or both, depending upon implementation) from, for example, the Wireless Emergency Alert (WEA) system, which are emergency messages sent by authorized government alerting authorities through mobile carriers, from the National Weather Service (NWS) via NOAA Weather Radio, NOAA Weather Wire Service, and the iNWS service, or other weather-related local mass notification sources, for example, weather channels and other commercial providers.

The weather alert message receiver 202 is connected to a master controller 204 for the system 200, as are the sensors 110. Ideally, a signal embedded in the human understandable weather alert signal is also broadcast that may contain specific information regarding the type of weather event, its current location, its expected track and speed, etc. which the weather alert message receiver 202 can pass along to the master controller 204 to aid in decision-making.

In order to prevent use of the system 200 to facilitate a break in to the building, the sensors 110 and master controller can be constructed to communicate using a specific handshake signal scheme and may further incorporate use of a strong security method, for example, a Hash Message Authentication Code or rolling key authentication that is augmented by encryption using 128-bit RC5 data encryption or 128 or 256-bit AES data encryption.

The master controller 204 is a computer that includes at least one processor 206 that runs programming to effect the operation described herein. In addition, storage 208 associated with the system 200, and accessible to the processor 206 of the master controller 204 contains, among other things, multiple automated protocols 210 (as will be described in greater detail below) that can be executed by the processor in response to a weather alert message. The master controller 204 is also communicatively connected, wirelessly or by wires, to actuators (not shown in FIG. 2) that are themselves physically connected to protective devices (not shown in FIG. 2) of the building 104-1. Depending upon the particular implementation, the protective devices and include, for example, folding or rolling storm/security shutters, storm windows, storm doors, retractable awnings, etc.

The storage 208 stores the protocols as well as any other format defining data structures, data-containing structures, and/or program instructions in a non-transitory manner, for example, such as non-transient solid state memory, a magnetic hard drive, a CD or DVD, a tape drive, or an analogous or equivalent storage medium type would.

As controlled by the master controller 204, the actuators cause the protective devices to move back and forth between a non-protective position and a protective position.

Figure 3A:
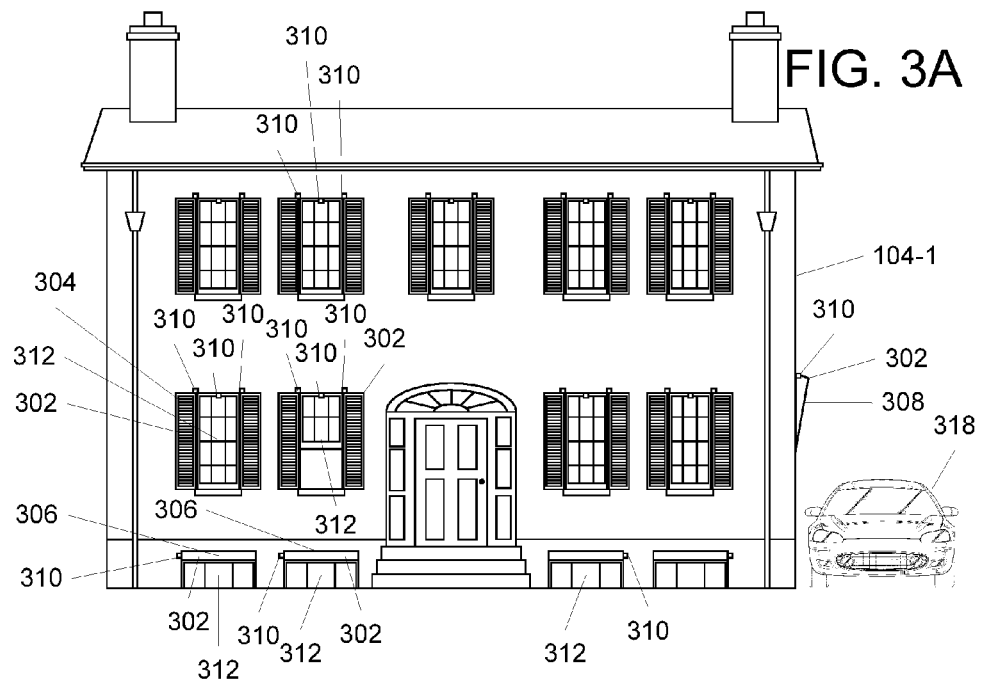
FIG. 3A illustrates, in simplified form, a front exterior view of the building of FIG. 1 and FIG. 2.

FIG. 3A illustrates, in simplified form, a front exterior view of the building 104-1 of FIG. 1 and FIG. 2. As can be seen in FIG. 3A, the building 104-1 includes multiple protective devices 302, for example, as shown, in the form of moveable window shutters 304, rolling storm/security shutters 306, and a retractable awning 308.

As noted generally above, each of the protective devices 302 has one or more actuators 310 connected to it, as do, for example, the windows 312, so that they can be opened or closed as well.

As can also be seen in FIG. 3A, all of the protective devices 302 are in their respective non-protective state, e.g., the shutters 304 are open, the rolling storm/security shutters 306 are rolled up, and the retractable awning 308 is retracted.

Figure 3B:
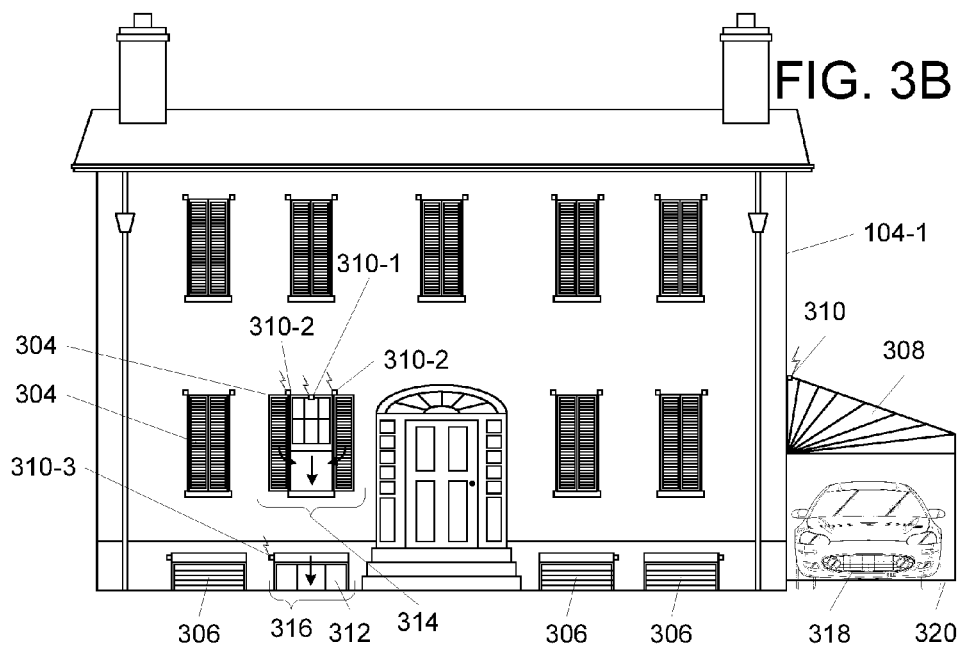
FIG. 3B illustrates, in simplified form, the front exterior view of the building of FIG. 3A during a time when the master controller is signaling to cause the actuators to move the protective devices from the non-protective state to the protective state in accordance with one of the protocols in response to a weather alert that may affect the local area.

FIG. 3B illustrates, in simplified form, the front exterior view of the building 104-1 of FIG. 3A during a time when the master controller 204 is signaling (illustrated by the lightning bolt signal symbols) to cause the actuators to move the protective devices from the non-protective state to the protective state in accordance with one of the stored automated protocols in response to a weather alert that may affect the local area 106. As can be seen in FIG. 3B, most of the window shutters 304 have been closed and one window 314 is in the process of being closed by its actuator 310-1 while its window shutters 304 are being closed by their respective actuators 310-2. Likewise, most of the lower level windows 312 are now protected by their rolling storm/security shutters 306 being in the protective position, whereas the actuator 310-3 for one of the lower windows 316 is just receiving its signal to close its rolling storm/security shutter 306.

In addition, as shown in FIG. 3B, due to, for example, the weather alert indicating a localized hail storm, to protect a vehicle 318 parked alongside the building 104-1 in a car port, the retractable awning 308 is extended and plastic sheeting 320 has been lowered to surround the vehicle 318.

Having described by way of example, the various components of our automated computerized system 200, the automated protocols 210 will now be described with reference to certain examples, with the understanding that these protocols are purely provided for purposes of understanding and that different locations and potential weather situations will dictate what specific protocols will be present in a particular implementation and the actions that they will cause as a result.

Advantageously, as noted above, our automated computerized system 200 operates such that, when the master controller 204 receives a weather alert via the weather alert message receiver 202 indicating that a weather condition will be occurring in the area 106 that may encompass the area 112, the master controller 204 will use at least the information in the weather alert and may also use information gleaned from the sensors 110 to decide which of the automated protocols 210 to use.

In general, the stored automated protocols 210 are written such that the inputs received by the master controller 204 from the weather alert and/or sensors 110 will dictate the signals to be sent to particular actuators to move their protective devices into a protective position and the conditions that must be present before the master controller 204 will signal the actuators to revert their protective devices back to their non-protective positions.

For example, a weather alert may indicate high winds and a dust storm. One automated protocol 210 may dictate polling the window actuators 310 to identify if any of the windows 312 are open and, if so, to automatically close them. In addition, since blowing debris presents a danger to the windows, the master controller will also note from the weather alert signal the direction of the storm and cause the actuators to close the protective devices 302 for all windows facing the direction the storm is coming from. Advantageously however, because local geography and structures may alter the wind direction near the building 104, so the protocol may further dictate monitoring the wind speed and direction sensors 110 at regular intervals and, if the wind direction alters and speed exceeds some set threshold, the actuators will be signaled to also (or alternatively) close those protective devices facing the direction that the wind direction sensors 110 indicate in addition to, or instead of, those in the direction specified by the weather alert. In addition, depending upon the wind speed and direction, the protocol may or may not call for the awning 308 to be actuated. Finally, the master controller 204 will continue to monitor for any signal from the weather alert message receiver 202 that indicates that the weather alert is no longer in effect, at which point, the master controller will apply the portion of the protocol it has been following to indicate to the various appropriate actuators 310 for the protective devices 302 to revert to the protective devices to their non-protective position, and, if appropriate or specified, cause windows that were open prior to the weather alert to re-open.

Likewise, irrespective of whether a signal is received by the master controller 204 via the weather alert message receiver 202 to indicate that the particular weather condition is no longer a potential danger to the building, the protocol may specify that if certain conditions are detected by the sensors for some period of time, then the protocol may indicate that the weather condition specified in the weather alert is no longer a potential danger to the building within the perimeter 112, for example, because of a shift in the weather path, and so the master controller 204 can cause the deployed actuators 310 to move their protective devices 302 back to their non-protective positions.

Another automated protocol 210 for a weather alert indicating hail, may call for all protective devices 302 for all windows 312 to be moved to a protective position when the light sensor indicates either a sudden darkening that usually precedes a hail storm or detection of a pattern of ground vibrations caused by hail stones beginning to strike nearby. Again, for example, the awning 308 and sheeting 320 might be deployed by a signal to its actuator 310 from the master controller to protect a vehicle 318 parked in that area but might not be deployed if the wind speed exceeds a specified level. Moreover, since hail is largely a summer phenomenon, if the weather preceding the hail storm has been overly hot (as indicated by the temperature sensors 110) and a hail storm can result in significant temporary local cooling, once the protective devices 302 over the windows 312 have been closed, the protocol may specify that the windows on the first floor on one side of the building be opened behind their protective shutters 304 be opened and other windows on the second floor on an opposite side of the house also be opened behind their protective shutters to create a cross-draft of the cool air.

Advantageously, the protocol may also include safety measures, for example, to allow a limited time period for override of any particular protocol, for example, because the owner or caretaker has arrived on site and will handle securing of the building, or to reverse any actuator from deploying and causing damage if it encounters an obstruction when actuating movement of a protective device between a protective and non-protective position or vice versa, for example, because a tree limb or part of a rain gutter may have fallen and is blocking its movement or because hail build-up during the storm is preventing movement. The protocols of system 200 may further specify a periodic re-trying at certain intervals and/or for some period of time to allow for self-clearing circumstances, for example, melting of the hail, before full movement of an impacted protective device can be completed.

Advantageously, the system 200 may further include protocols for notifying the owner, caretaker or other entity if, for example, some actuator 310 cannot be moved, either before or after a weather event, which may indicate, in the former case, that some human protective intervention may be required or, in the latter case, some exterior damage may be present. Such notifications can include automatically sending an e-mail or SMS message, triggering some indication within a mobile app or on a web site, causing sending of an automated phone call to a designated number, or some combination thereof.

Thus, it should now be understood that systems 200 constructed according to the teachings herein can readily be configured to pro-actively, and automatically, protect against damage from different weather conditions without the need for human intervention, thereby reducing the prospect of damage to an unoccupied building from such conditions.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. An automated, computerized system for pro-active protection of a building from damage due to weather conditions, the system comprising:
- multiple sensors establishing a perimeter about the building;
- a weather alert message receiver;
- a master controller, including at least one processor, communicatively connected to the multiple sensors and the weather alert message receiver;
- non-transient storage, accessible by the master controller, the non-transient storage having stored therein multiple automated protocols, the multiple automated protocols being executable by the processor of the master controller in response to a received weather alert message; and
- multiple actuators connected to protective devices of the building, the multiple actuators being communicatively connected to, and under the control of, the master controller;

wherein the master controller will, when a weather alert is received via the weather alert message receiver indicating a particular weather condition will be occurring within an area encompassing the perimeter, without any human intervention:
  i) automatically execute a specific protocol from among the multiple automated protocols to thereby cause at least some of the multiple actuators to change at least one protective device from a non-protective position to a protective position until, as specified by the specific protocol, a signal is received by the master controller
    a) via the weather alert message receiver, that the weather alert is no longer in effect, or
    b) from at least some of the multiple sensors, indicating that the particular weather condition is no longer a potential danger to the building,
at which time the master controller will automatically signal the at least some actuators to return the at least one protective device to the non-protective position.

* * * * *